(12) United States Patent
Vernon

(10) Patent No.: US 10,493,382 B1
(45) Date of Patent: Dec. 3, 2019

(54) VAPOR RECOVERY TANK

(71) Applicant: James B. Vernon, Oklahoma City, OK (US)

(72) Inventor: James B. Vernon, Oklahoma City, OK (US)

(73) Assignee: Vapor Recovery Solutions LLC, Oklahoma City, OK (US)

( * ) Notice: Subject to any disclaimer, the term of this patent is extended or adjusted under 35 U.S.C. 154(b) by 79 days.

(21) Appl. No.: 15/499,198

(22) Filed: Apr. 27, 2017

Related U.S. Application Data

(60) Provisional application No. 62/330,299, filed on May 2, 2016.

(51) Int. Cl.
| | |
|---|---|
| *C10G 31/06* | (2006.01) |
| *C10G 33/00* | (2006.01) |
| *C10G 53/02* | (2006.01) |
| *B01D 19/00* | (2006.01) |
| *E21B 43/34* | (2006.01) |

(52) U.S. Cl.
CPC ...... *B01D 19/0073* (2013.01); *B01D 19/0063* (2013.01); *E21B 43/34* (2013.01)

(58) Field of Classification Search
CPC ............ B01D 19/0073; B01D 19/0063; B01D 19/0068; B01D 19/0036; B01D 17/02; B01D 17/0208; B01D 17/0214; E21B 43/00; E21B 43/16; E21B 43/34–40
See application file for complete search history.

(56) References Cited

U.S. PATENT DOCUMENTS 7,350,581 B2    4/2008  Wynn
2017/0335205 A1*  11/2017  Meyer ..................... C10G 7/00

* cited by examiner

*Primary Examiner* — Cabrena Holecek
(74) *Attorney, Agent, or Firm* — Phillips Murrah PC; Martin G. Ozinga

(57) ABSTRACT

The present invention essentially comprises a replacement for the prior art vapor recovery towers with a tank utilized with a separator, vapor recovery unit, and a holding tank and or tank battery wherein the tank may be made from an atmospheric tank.

1 Claim, 3 Drawing Sheets

VAPOR RECOVERY TANK

CROSS-REFERENCE TO RELATED APPLICATIONS

Priority is claimed from provisional patent application U.S. Ser. No. 62/330,299 filed on May 2, 2016, and incorporated by reference herein.

BACKGROUND OF THE INVENTION

1. Field of the Invention

In general, the present invention relates to an apparatus, system and method of vapor recovery from oil and gas well operations. More particularly, the present invention provides a new and improved vapor recovery tank for capturing gas from oil moving to a storage tank and generally replaces existing vapor recovery towers known in the art.

2. Description of the Prior Art

Typically, of wells in general, subterranean fluids and gas are moved from below ground to above ground wherein the subterranean fluids and gas may be separated for use. It is common for the subterranean fluid to have mixtures of oil and water intermixed with gas in greatly varying proportions depending on many factors of the geological formation, type of well and so forth. Depending on the well profile of amounts of water, gas and oil present in the production, different types of recovery systems are employed, but all share the need for a system to separate and store the varying amounts of elements produced.

It is also well known to pass production from wells into separator units wherein the gas, water, and oil are essentially separated. The separator unit then generally sends the separated elements, such as water, gas and oil into respective containment systems for each element. The vertical or horizontal separator or production units were invented in the 1930s and have not been materially changed since that time.

Although the majority of gas is recovered and passed into a separate storage vessel or sales line designed to hold natural gas, the separated oil goes into storage tanks. It is understood that the gaseous elements continue to be released or evaporate from the accumulated oil even after the separation. It is also understood that oil in liquid form continues to release gasses and that the grade of the oil is a direct correlation to its volatility and thereby, its release of gaseous elements.

The term "vapor recovery unit" also referred to as a "VRU", was coined in 1952. This system was a small compressor package specifically designed to capture natural gas emissions from oilfield stock tanks. Most commonly, the tanks were tied together with a manifold and the common line is the suction line on the compressor. This suction line would have to be a large size to overcome pressure losses.

A vapor recovery tower, also referred to as a "VRT", is a tall pressure vessel installed between the production separator and the oil tanks. ANADARKO first began using these towers in 1993. The vapor recovery tower has a retention time of 25-30 minutes and allows gas to break out of the oil. The compressor suction inlet is connected to the vapor recovery tower instead of the oil tanks. The vapor recovery tower typically has less than 2 psi on it and gravity feeds the oil to the stock tanks. The benefits of the vapor recovery tower include insulating surges to the vapor recovery unit from gas surges from stock tanks, vapor recovery tower is more tolerant to pressure swings, stabilizing suction pressure allows for smoother operation of vapor recovery unit, reducing suction line pressure drop by at least ten times and eliminates issues with seal and oxygen contamination on stock tank hookups.

Vapor recovery towers are typically between 20 and 48 inches in diameter and are typically between 30 and 35 feet in height, to allow oil to be gravity fed into stock tanks and to increase gas volume in the vessel.

A prior art vapor recovery tower is generally shown in FIG. 3. The tower is a vertically oriented vessel, typically made of tubular material and having capped bottom and top ends. Oil flows from the separator or heater treater to an inlet. The oil falls vertically into a pool of oil. During the vertical drop, some vapors leave the oil and flow up to a gas outlet and on to the compressor and sales line. When the oil contacts the pool, it typically still contains gas or vapors. The oil slowly moves to the bottom of the vessel wherein more gas leaves the oil and flows up. When the oil reaches the bottom of the vessel, it flows out of the outlet and into a storage tank. The flow is typically passive so as not to require a pump; as the level of oil inside the vapor recovery tower is the same as the oil fill line, which is piped into the storage tank. Rise of oil level in the vapor recovery tower, results in oil flowing out of the vapor recovery tower into the storage tank. The vapor recovery tower removes most of the vapor from the oil, without the introduction of atmospheric air. However, the vapor recovery tower is ill equipped to handle surges of oil from the oil inlet and some vapor makes its way into the storage tank. The oil in the pool sinks to the bottom. As the oil sinks, hydrostatic pressure on the oil increases, making gas separation difficult.

The above discussed limitations in the prior art is not exhaustive. Thus, there is a need for an apparatus, method and system to separate the varying components found during well production that maximizes recovery of all hydrocarbons and is environmentally friendly. The current invention provides an inexpensive, time saving, more reliable apparatus and method of near complete recovery of hydrocarbons from a well where the prior art fails.

SUMMARY OF THE INVENTION

In view of the foregoing disadvantages inherent in the known types of vapor recovery systems now present in the prior art, the present invention provides a new and improved vapor recovery tank and or system. As such, the general purpose of the present invention, which will be described subsequently in greater detail, is to provide a new and improved vapor recovery tank and or system, which has all the advantages of the prior art devices and less and or none of the disadvantages.

To attain this, the present invention essentially comprises a replacement for prior art vapor recovery towers with a vapor recovery tank wherein the tank is shorter and holds a larger volume. The tank may be made from known atmospheric tanks and generally utilized with a separator, vapor recovery unit and storage tank and or tank battery.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved vapor recovery tank and or system, which may be easily and efficiently manufactured and marketed.

It is a further object of the present invention to provide a new and improved vapor recovery tank and or system, which is of a durable and reliable construction and may be utilized in numerous types of well operations.

An even further object of the present invention is to provide a new and improved vapor recovery tank and or system, which is susceptible to a low cost of manufacture with regard to both materials and labor, and which accordingly is then susceptible to low prices of sale to the consuming industry, thereby making such tool economically available to those in the field.

Still another object of the present invention is to provide a new and improved vapor recovery tank and or system, which provides all of the advantages of the prior art, while simultaneously overcoming some of the disadvantages normally associated therewith.

Another object of the present invention is to provide a new and improved vapor recovery tank and or system that may reduce suction line pressure drop by at least ten times generally compared to a vapor recovery unit tied directly to multiple stock tanks.

Yet another object of the present invention is to provide a new and improved vapor recovery tank and or system that may be manufactured from existing equipment such as but not limited to an atmospheric tank.

An even further object of the present invention is to provide a new and improved vapor recovery tank and or system, which improves and or lengthens retention time for the removal of gas from the oil.

Still another object of the present invention is to provide a new and improved vapor recovery tank and or system that may insulate surges to the vapor recovery unit from gas from stock tanks.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS AND APPENDICES

The invention will be better understood and objects other than those set forth above will become apparent when consideration is given to the following detailed description thereof. Such description makes reference to the annexed pictorial illustrations, graphs, drawings and appendices wherein.

DETAILED DESCRIPTION OF THE PREFERRED EMBODIMENTS

Figure 1:
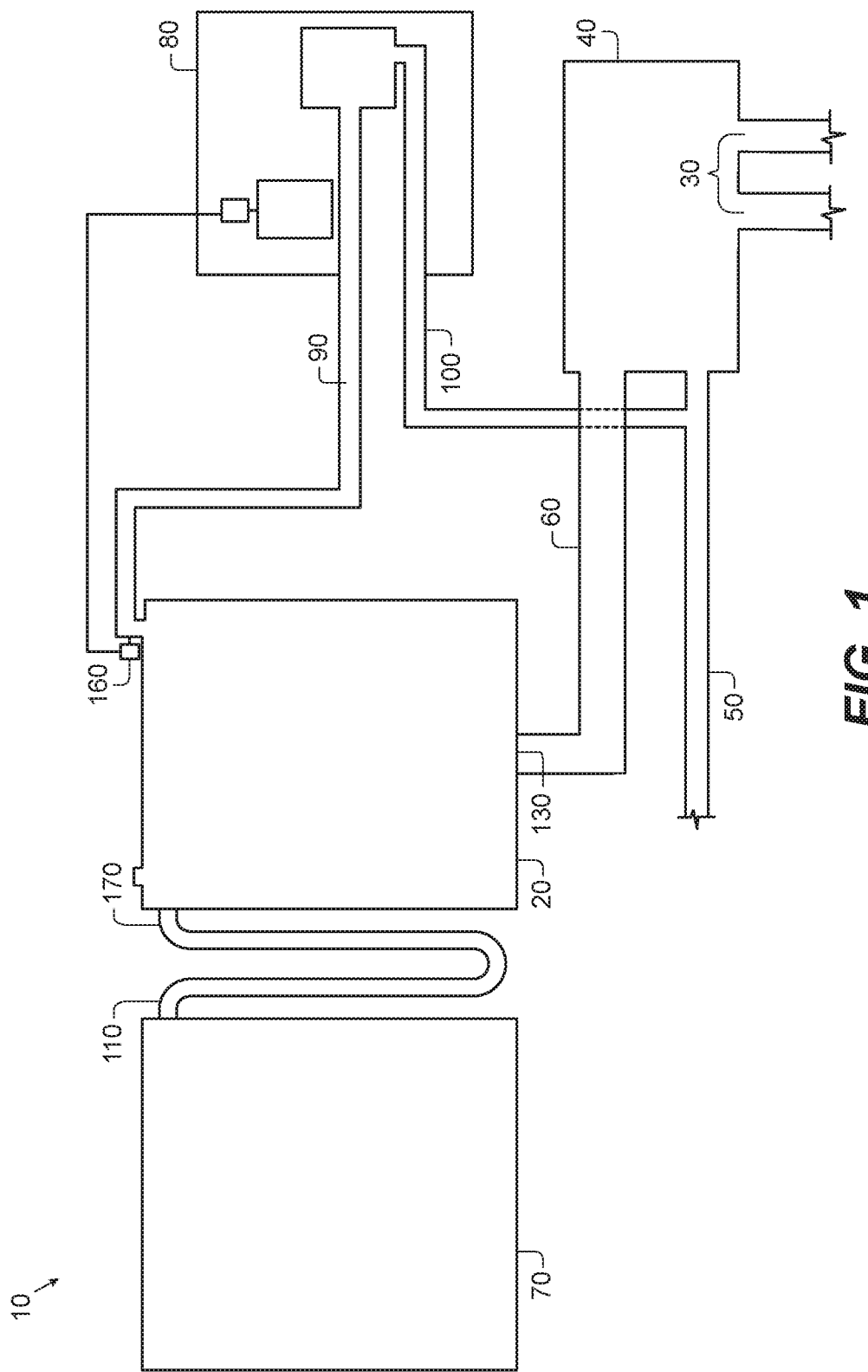
FIG. 1 is a general illustration of a preferred embodiment of the invention depicting a separator, vapor recovery tank, a vapor recovery unit and a stock tank for oil and gas operations.
Figure 2:
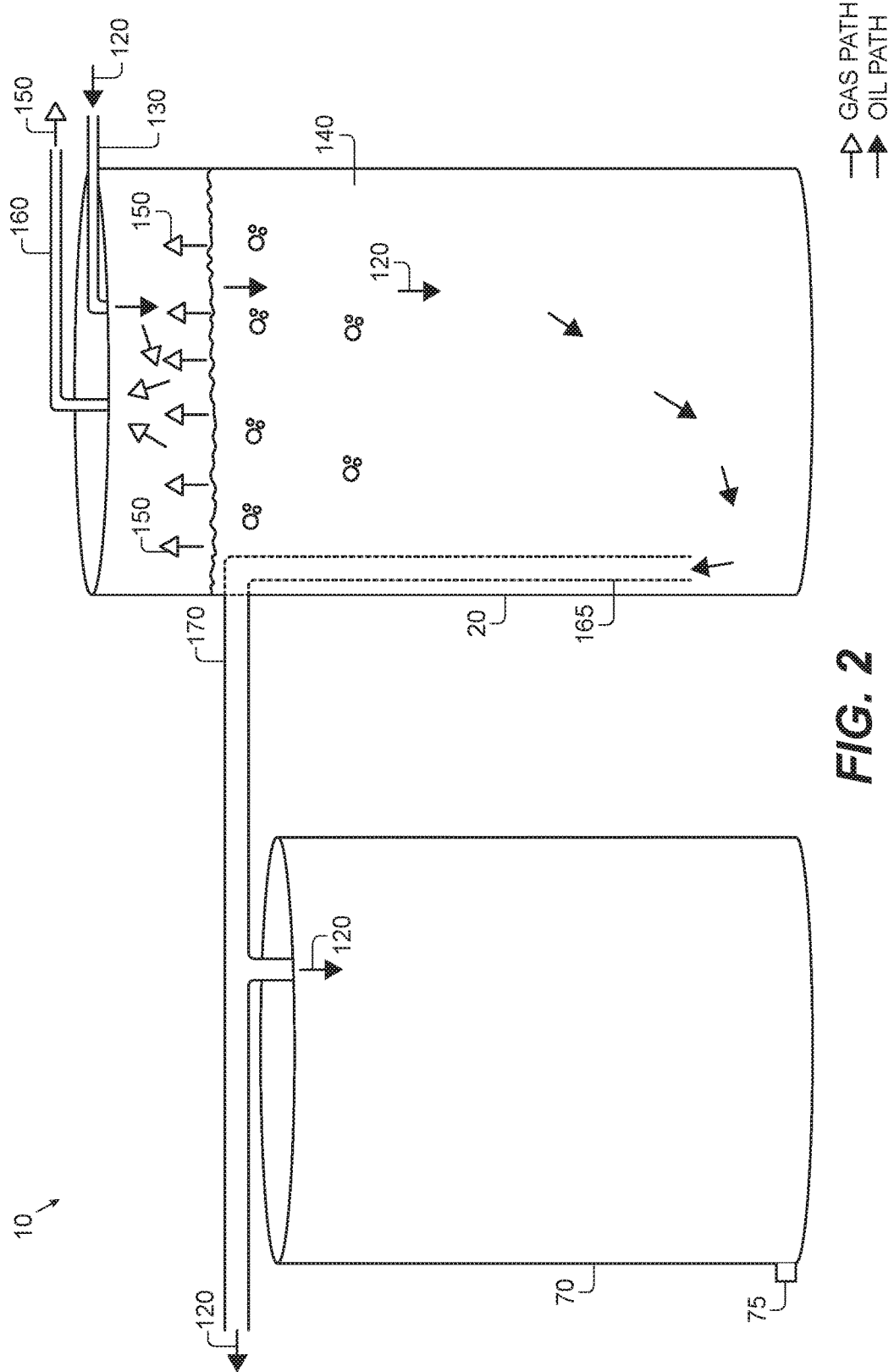
FIG. 2 is general illustration of a preferred embodiment of the invention depicting a vapor recovery tank and a stock tank.

Referring to the illustrations, drawings and pictures, and to FIG. 1 and FIG. 2 in particular, reference character 10 generally designates a new and improved vapor recovery tank, system and method of using same constructed in accordance with the present invention. Invention 10 is generally used in well operations associated with oil and gas.

FIGS. 1 and 2 generally depict a vapor recovery tank 20 that is used in combination with conventional oil and gas well production equipment. In such an operation, the oil and gas is drawn from the wells through tubes 30 and pushed into a liquid separator or heater treater 40. The liquid separator 40 separates the oil from the gas, moving the gas through a sales line 50, which is a pipe connected to natural gas companies' distribution networks. The oil is pushed by the gas through another pipe 60 into vapor recovery tank 20 and then into a stock, storage and or holding tank 70, where it is stored until the holding tank 70 is generally full and ready to be distributed for sale.

It is understood that holding tank 70 may be conventional as known in the art and may have a valve (not shown) located on the top of the holding tank 70 for releasing gas pressure that builds up in the holding tank 70. The valve is a safety release valve to protect the holding tank 70 from retaining too much gas pressure inside and thereby causing the holding tank 70 to fracture.

The vapor recovery unit 80 is preferably interposed between the vapor recovery tank 20 and the sales line 50 during operation. This location may enable the vapor recovery unit 80 to maintain fluid communication with vapor recovery tank 20 and the sales line 50. A person having ordinary skill in the art will recognize that the vapor recovery unit 80 can be positioned in a variety of places so long as fluid communication with vapor recovery tank 20 and the sales line 50 is maintained.

Vapor recovery unit 80 may include a compressor (not shown), which may be drivingly linked to an engine that may be fueled by natural gas, internal combustion gasoline engine, electric motor and so forth as known in the art. A first conduit or suction line 90 may extend from fluid communication with vapor recovery tank 20 back to vapor recovery unit 80. First conduit 90 may be a circular cylindrical pipe that extends from the top of the vapor recovery tank 20 to vapor recovery unit 80. A second conduit 100 may extend from vapor recovery unit 80 to fluid communication with the sales line 50. As a person having ordinary skill will recognize, the connection location of the second conduit 100 to the sales line 50 and first conduit 90 from vapor recovery tank 20 to vapor recovery unit 80 may vary depending upon the size and arrangement of the operation. It is also understood that a person of ordinary skill will recognize that other structures, such as check valves and other safety equipment, may become necessary.

It is also contemplated to provide third conduit 110 that may provide fluid communication from vapor recovery tank 20 to holding tank 70. It is understood that numerous types of pipes, connecters, valves and so forth known in the art may be utilized and the current invention 10 should not be considered limited to the illustrations. It is also understood that holding tank 70 may be part of tank battery system utilizing one or more holding tank 70 and may include an oil outlet 75 for removal of the oil from holding tank 70

In operation, oil and gas well production begins when oil flows from the wells through the tubes 30 into separator 40. The separator 40 works in a conventional manner to separate the oil from the gas. The oil is pushed in a conventional manner by a minimal amount of gas from the separator 40 through pipe 60 into vapor recovery tank 20.

Oil 120, as generally depicted as a black headed arrow, flows from the separator or heater treater 40 and to inlet 130. The oil 120 falls vertically into a pool 140 of oil 120. During the vertical drop, some vapors and or gas 150, generally depicted as arrow with non-blacked in heads, leave the oil 120 and flow up to a gas outlet 160 and on to sales line 50. It is understood that gas outlet 160 may communicate first with vapor recovery unit 80 before returning to sales line 50. When oil 120 contacts the pool 140, it typically still contains trapped gas or vapors. The oil 120 slowly moves to the bottom of vapor recovery tank 20 wherein more gas 150 leaves the oil 120 and flows up.

When the oil 120 reaches the bottom of vapor recovery tank 20, it flows up conduit 165 and out of the oil outlet 170 and into holding tank 70. It is understood that although the vapor recovery tank 20 and holding tank 70 are in communication, they may not have the same oil level. It is understood that the vapor recovery tank 20 may keep a near constant level, while the holding tank 70 will start relatively empty and be filled until the pumper shuts the valve off and opens the valve on different holding tank 70.

The flow is typically passive so as not to require a pump although the invention 10 may include a pump and or pumps. The level of oil 120 inside vapor recovery tank 20 is generally the same as the oil 120 level in the holding tank 70. To drop the oil 120 level in the holding tank 70 or a rise of oil 120 level in the vapor recovery tank 20, results in oil 120 flowing out of vapor recovery tank 20 into the holding tank 70. Vapor recovery tank 20 generally removes most of the gas 150 from the oil 120, without the introduction of atmospheric air.

Figure 3:
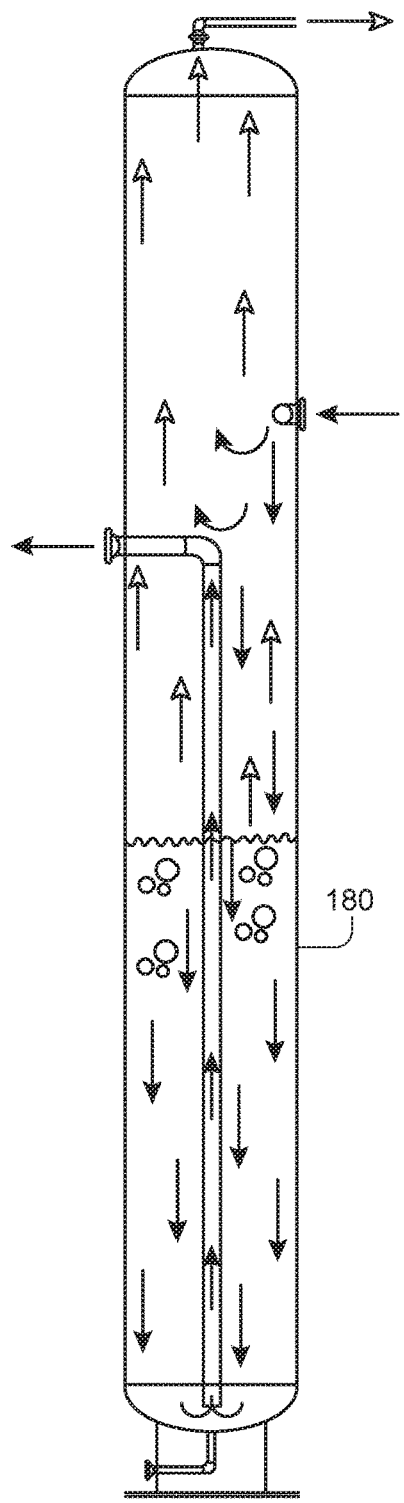
FIG. 3 is a general illustration of a prior art vapor recovery tower.

Invention 10 contemplates that vapor recovery tank 20 may use an atmospheric tank that may have many benefits over the traditional vapor recovery unit 80 connected directly to the holding tanks 70 and or prior art vapor recovery tower 180 generally depicted in FIG. 3. Invention 10 contemplates a lower cost. Wherein prior art vapor recovery tower 180 may cost over $20,000, the current invention may cost less than $10,000.

Invention 10 may provide a longer retention time. Prior art vapor recovery tower 180 may have a retention time of less than one hour whereas the current invention 10 contemplates retention times of several hours. These longer retention times will allow more gas 150 to breakout of the oil 120 as well as allow water to separate from the oil 120. Further, invention 10 may allow basic sediment and water to settle out before the oil 120 is fed to the holding tanks 70 thereby reducing tank bottoms.

Invention 10 may keep gas 150 separate from air and may keep air from entering the system when a thief hatch on holding tanks 70 is opened, may insulate surges to the vapor recovery unit 80 from gas 150 surges from holding tanks 70, be more tolerant to pressure swings, and or stabilizing suction pressure allowing for smoother operation of vapor recovery unit 80. Still further, invention 10 contemplates reducing suction line pressure drop by at least ten times compared to hooking vapor recovery unit 80 directly to multiple holding tanks 70 with first conduit or suction line 90.

Invention 10 vapor recovery tank 20 may be between 10 and 16 feet in diameter with 12 feet being more common. In a preferred embodiment, vapor recovery tank 20 may be typically 5 feet taller than the stock tanks 70 whereas most stock tanks 70 are 15 feet in height. It is understood that numerous configuration, shapes, sizes, heights, widths, diameter and so forth are contemplated.

It is also to be understood that vapor recovery tank 20 gas 150 volume is significantly larger than that of the prior art vapor recovery tower 180, which may stabilize suction pressure on vapor recovery unit 80 better than the prior art vapor recovery tower 180. This may allow smoother operation of vapor recovery unit 80.

Invention 10 therefore may be a vapor recovery system for oil and gas production comprising a sales line; a separator having an inlet in communication with a well, a gas outlet in communication with said sales line, and an oil outlet; a vapor recovery tank having an oil inlet in communication with said oil outlet of said separator, an oil outlet, a gas outlet, an oil level, and wherein said vapor recovery tank is made from an atmospheric tank; a vapor recovery unit having a gas inlet in communication with said gas outlet of said vapor recovery tank and gas outlet in communication with said sales line; and a holding tank having an oil outlet, an oil inlet in communication with said oil outlet of said vapor recovery tank, an oil level, and wherein said holding tank is adapted to always have a lower said oil level than said oil level of said vapor recovery tank.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

What is claimed is:

1. A vapor recovery system for oil and gas production comprising:
 a sales line;
 a separator having an inlet in communication with a well, a gas outlet in communication with said sales line, and an oil outlet;
 a vapor recovery tank having an oil inlet in communication with said oil outlet of said separator, a conduit having an oil outlet and an opening located at the bottom of said tank for passing oil through said conduit and out said oil outlet of said conduit, a gas outlet, an oil level, and wherein said vapor recovery tank is made from an atmospheric tank;

a vapor recovery unit having a gas inlet in communication with said gas outlet of said vapor recovery tank and gas outlet in communication with said sales line; and a holding tank having an oil outlet, an oil inlet in communication with said oil outlet of said vapor recovery tank, an oil level, and wherein said holding tank is adapted to always have a lower said oil level than said oil level of said vapor recovery tank by having said conduit opening below said level of oil in said tank.

\* \* \* \* \*